United States Patent
Ullman

[11] Patent Number: 6,098,567
[45] Date of Patent: Aug. 8, 2000

[54] DRIVER'S SEAT FOR MOTOR OF SAILBOATS

[76] Inventor: Johan Ullman, Medinova AB, Johannebergsgatan 30, 412 55 G Teborg, Sweden

[21] Appl. No.: 08/845,993

[22] Filed: Apr. 25, 1997

[51] Int. Cl.[7] .................................................... B63B 29/00
[52] U.S. Cl. .......................................... 114/363; 297/195.1
[58] Field of Search ........................ 114/363; 297/195.1, 297/195.11, 215.1, 215.11

[56] References Cited

U.S. PATENT DOCUMENTS

| | | | |
|---|---|---|---|
| 5,367,978 | 11/1994 | Mardikian | 114/363 |
| 5,669,326 | 9/1997 | Ikeda | 114/363 |

*Primary Examiner*—Jesus D. Sotelo
*Attorney, Agent, or Firm*—Schweitzer Cornman Gross & Bondell LLP

[57] ABSTRACT

The invention refers to driver's seat for boats, including at least a seat and a steering device. The purpose of the invention is to provide a seat and steering device which reduce the risk of injuries when driving boats during hard conditions and in bad weather. By means of the invention the driver should have the possibility to use his arms, legs and thigh muscles as shock absorbing elements which will reduce the risk of injuries to the driver's back. The driver's seat should at the same time be designed to create good comfort and good control possibilities for driving the boat. The invention is characterized by that the seat is saddle shaped, elastic and designed with elements for absorbing side forces and, that the steering device is designed as a handlebar with controls, at least the control for the gas, arranged at one end of the handlebar.

7 Claims, 6 Drawing Sheets

DRIVER'S SEAT FOR MOTOR OF SAILBOATS

TECHNICAL FIELD OF THE INVENTION

The invention refers to the design of a driver's seat by motor or sail driven boats, preferably for sea vessels including at least one seat and a steering device.

BACKGROUND OF THE INVENTION

When driving smaller boats, in particular at difficult conditions the driver is exposed to great physical strains. The boat is tossed about and beats hard against the waves and the driver is jerked along. This is perhaps particularly marked for planing boats which are driven in hard weather and rough sea such as for example sea rescue boats on rescue tasks but this is also a problem when it concerns racing boats and rapid pleasure boats. The jerks result in that the driver has difficulties to keep full control of the boat simultaneously as the body is exposed to injury risks. A complex moving pattern arises in these situations in which the driver is exposed to rocking, rolling, heaving, jerks and vibrations, all in an unpredictable way. If the driver sits in a common boat seat behind a steering-wheel the back in particular is exposed to heavy torques and not seldom injuries occur in the spine as a result. These risks should it possible be minimized.

THE OBJECT OF THE INVENTION

The object of the present invention is to provide a seat and a steering device that reduces the risk of body injuries when driving motor or sail driven vessels, preferably of boats during rough conditions and in a hard weather. According to the invention the driver shall have the possibility to use his legs and thigh muscles as shock absorbing elements which among other things reduces the risk of injuries in the back. At the same time the drivers seat location should be designed such that it gives high comfort and gives good control over the maneuvering of the boat. This is solved according to the invention by means of the measures stated in the patent claims.

LIST OF DRAWINGS

In the following the invention will be described with reference to the enclosed drawings, in which.

SPECIFICATION OF EMBODIMENTS

Figure 1:
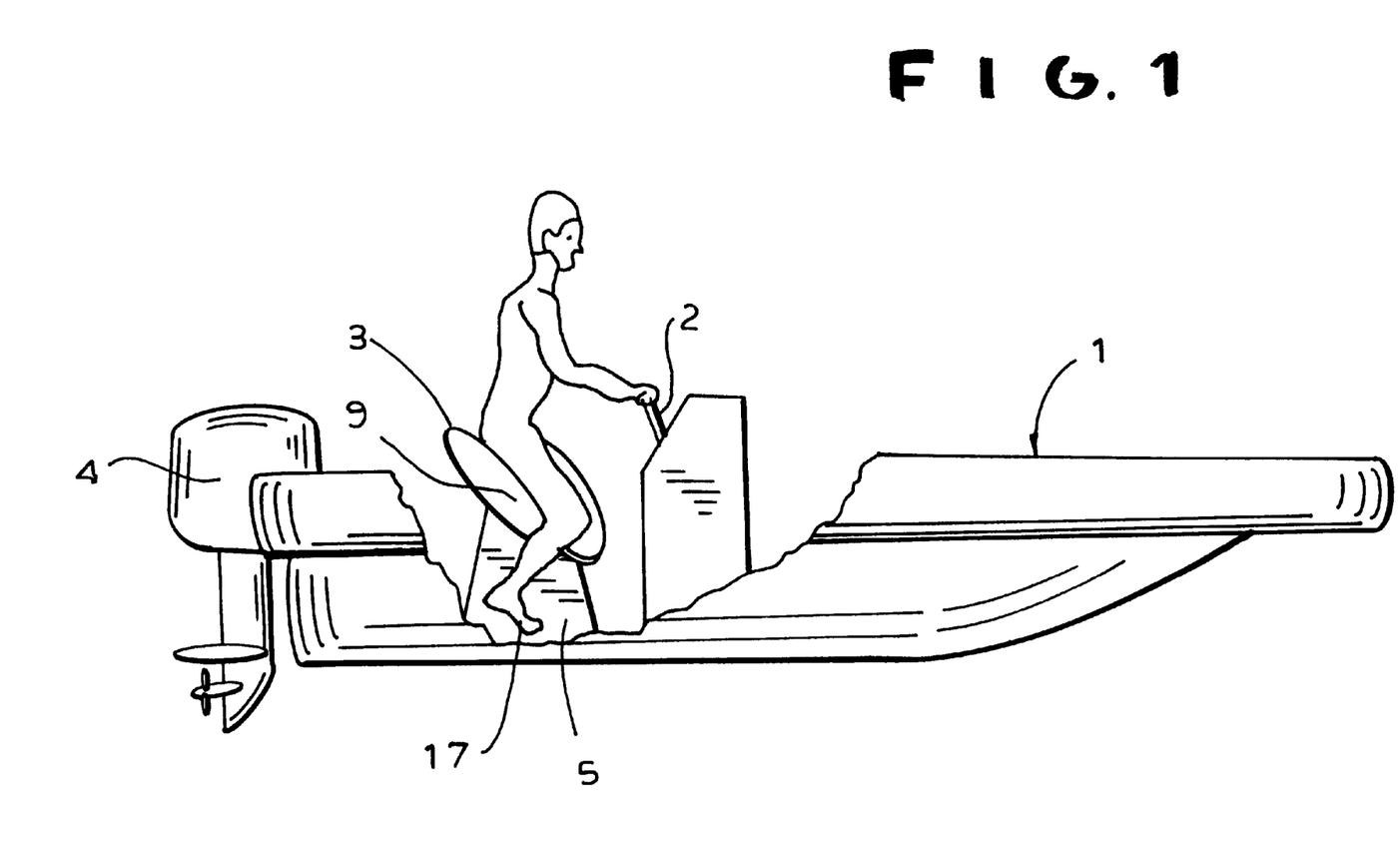
FIG. 1 shows a lateral view (partly broken) of a working boat in which the driver's seat may be seen.

In FIG. 1 a common smaller working boat 1 intended for patrol or rescue tasks is shown. The driver's seat, being located at the aft part of the boat, among other things includes a steering and a control device 2 and a seat 3. An engine 4 located aft drives the boat ahead.

Figure 2:
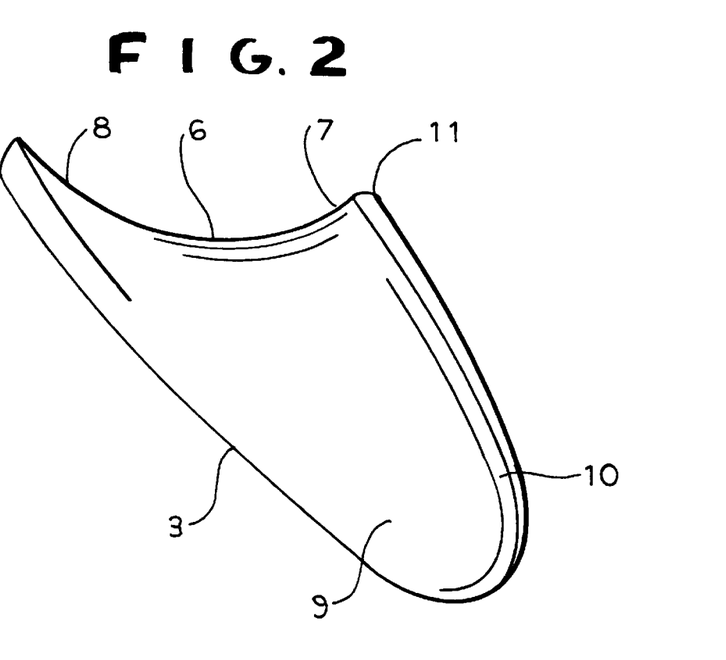
FIG. 2 shows a seat according to the invention in a lateral view.

As can be seen in FIG. 2 the seat 3 is saddle shaped and preferably resiliently suspended on a support 5. The support 5 primarily consists of a metal box but may be formed in various ways. The seat 3 is placed on the upper part of the box. The sitting surface 6 of the seat is mainly horizontally situated and gives a good support for the ischial tuberosities of the driver. The front part of the seat 3 exhibits a portion 7 sloping backwards which prevents the driver from sliding ahead e.g. by retardation. In a corresponding way the rear part of the seat 3 at the top is provided with a portion 8 sloping forwards in order to prevent sliding backwards.

Further, the seat 3 along its long sides as provided with essentially vertically oriented side portions 9 which at least extend forwards-downwards and somewhat outwards in such a way that the inside of the thigh and the knees of the driver, during driving of the boat, in all positions, can be pressed against the surface of these side portions 9 and obtain support. The foremost situated parts 10 of the side portions 9 hereby will extend before the vertical line through front edge of the seat 11. The side portions 9 are fixedly connected with the horizontal part of the seat (the sitting surface 8) and is preferably manufactured in one piece with the sitting surface. The seat 3 and the side portions 9 will therefore move synchronously during use.

At use the thighs of the driver thus take a forwards-downwards directed position while the shanks are angled backwards-downwards (see FIG. 1). At optimum driving position the knee angle is between 80 and 160 degrees and thigh-torso angle is between 100 and 160 degrees. Hereby the driver obtains a good stability sideways at the same time as the driver can take a half standing position with only slightly bent knees. Through this position of the legs, open thigh-torso angle and shanks pointing backwards, the pelvis will take such an angle that the lordose in the lumbar part of the back will be preserved and the spine takes the same form as in standing position. Hereby an advantageous degree of overlap is obtained at actin and myosin fibrils of the muscles in the thigh muscles. The pressure per unit area against the behind diminishes at the same time as the legs are able to absorb vertical bumps in a considerably higher degree than what otherwise is the case. In this way the bump thrust diminishes against the back, the comfort increases and the risk for injuries diminishes considerably.

Figure 3:
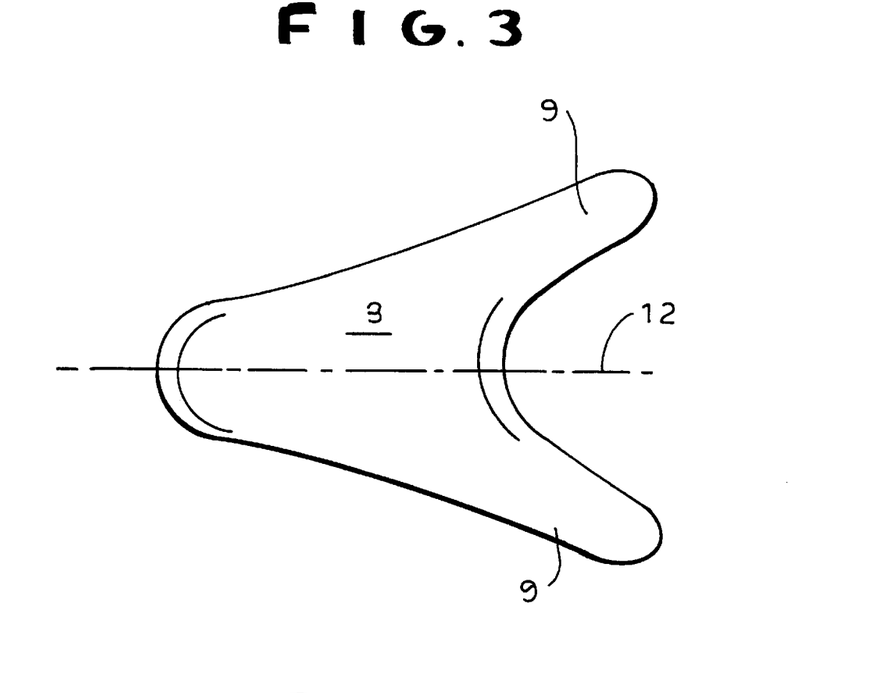
FIG. 3 shows the seat from above.

The side portions 9 of the seat are preferably somewhat slanted seen from the above (see FIG. 3). The width is largest at the front edge of the seat and narrows off backwards. This makes that the driver by pressing together the legs and the knees easier may counteract gliding ahead. This obliquity can be formed more or less marked depending on what effect of application one wishes to attain. A suitable obliquity is 5–15 degrees in relation to the longitudinal axis 12 of the seat. The side portions 9 advantageously can also be formed with a slightly concave surface (see FIG. 2) which better conforms to the shape of the leg of the driver.

The seat 3 can be manufactured of reinforced plastic with a substantially hard surface and thereby becomes very weather proof and wear resistant. But the seat may also advantageously be designed with a soft surface for example of tissue, hide or artificial material and may also preferably be stuffed/padded with a shock absorbing material such as foam plastic, cold foam or the like.

The seat 3 is preferably provided adjustable on the support 5 which in its turn is fixedly mounted in the boat 1.

Figure 4:
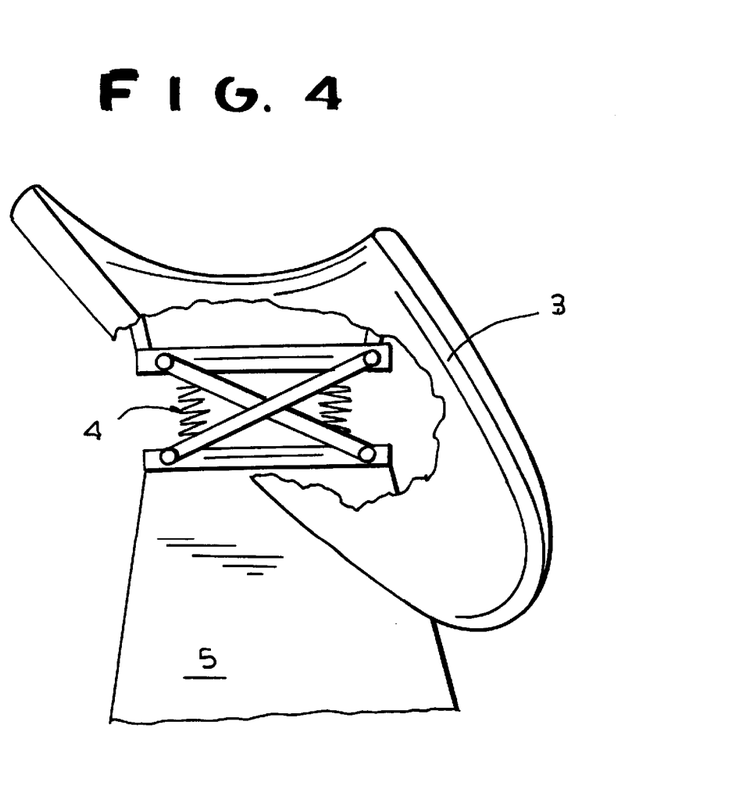
FIG. 4 shows the suspension of the seat by means of gas springs.
Figure 5:
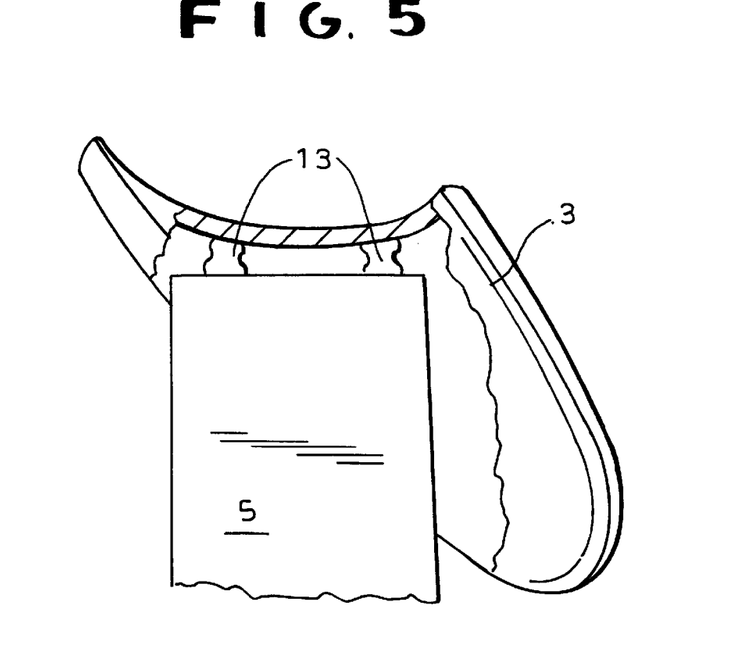
FIG. 5 shows an alternative suspension device.

The position of the seat 3 can be adjusted in both height and longitudinal direction and thereby gives possibility of optimal balancing of the body weight of the driver. By suspending the seat 3 on a joint mounted stool 14 with springs, see FIG. 4, a resilient effect is achieved that absorbs bumps and shocks and reduces the risk that these moments reaches the spine. A simpler form of "resilient" suspension is shown in FIG. 5. Here the seat 3 is mounted on four elastic elements for example rubber cushions 13 which give sufficient damping.

Figures 6, 7:
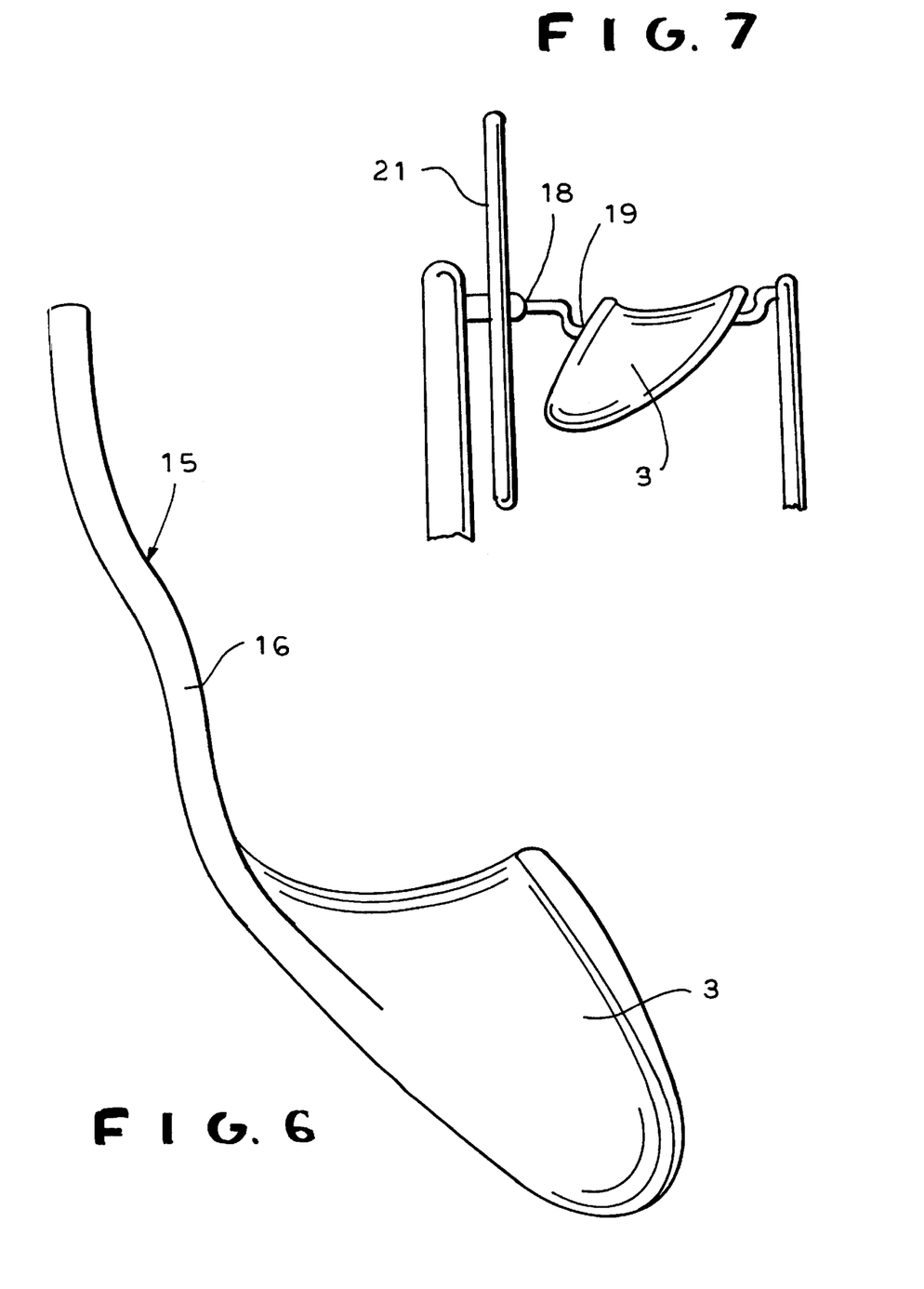
FIG. 6 shows a seat with back according to the invention.
FIG. 7 shows a rotatable suspension of the seat.

As can be seen in FIG. 6, the seat 3 can advantageously also be provided with a back 15 that increases the comfort when the boat 1 is driven in calm weather and when the physical stresses are moderate. A back 15 allows the advantage of greater possibilities to vary the sitting position and according to the invention is provided with a sway support 16. The back 15 is high to support the whole back and also relieves the thoracic spine through the moderately s-shaped design. The front portion 7 slanting backwards on the seat 3 prevents the driver from gliding off the seat forwards. In one embodiment the back 15 can also be provided with side edges (not shown) so that a support sideways is obtained. This allows that the driver, in moderate sea, can choose to completely follow the movements of the boat.

In order to further increase the comfort when utilizing the back a tilting mechanism (not shown) can be provided in the suspension device of the seat 3. The mechanism allows for the seat to be tilted slightly backwards. In that respect it is import that the mechanism is adjusted so that the seat is stable in the normal position (in its horizontal position).

In order to fit persons with different body length, at various driving conditions or for various driving positions, foot supports 17 are arranged in connection to or near the seat 3 (see FIG. 1). The foot supports 17, which have the shape of plates or foot bars, are adjustable vertically in the purpose of enable optimum conditions for the driver to redistribute the body weight. The foot supports 17 can also have more fixed positions and be provided with elements that prevent the foot from sliding off to the side. Further the foot supports 17 may be provided with a soft shock absorbing surface.

The foot supports 17 preferably may be placed about 0–20 cm in front of the vertical line through the seat tuberosities of the driver. The location of the foot supports 17 in front of the centre of gravity of the torso results in that the flexor muscles of the arms are used for stabilization of the driver when he lifts from the seat, and thereby allows the driver to have better control of the handlebars and the boat. Foot supports 17 are also arranged or can be adjusted to a position higher up and further ahead than the normal position when the driver uses the back and the centre of gravity of the torso falls behind the ischial tuberosities. The foot supports 17 further may be provided with loops above the foot so that the driver is prevented from falling over board at unforeseen jerks.

The driver's seat according to the invention can also be used in sailboats where special requirements have to be met with, for example by particularly demanding long sailings and/or sail races. Since sailboats at rough sailing tilt substantially there is a problem that the working position easily becomes uncomfortable and tiring for the steersman. This is solved according to the invention in that the seat 3 is suspended pivotable on a pivot 18 which preferably coincides with the axis of the boat steering 21.

By suspending the seat 3 in an adjustable "u-shaped" support device 19 (see FIG. 7) easier balance in the system steersman-and-seat by means of an advantageous location of the centre of gravity in the system is obtained.

In this application the floor 20 is formed as a concave surface (see FIG. 8), and possibly provided with "facets" 27, so that the steersman irrespective of the tilt of the boat has essentially the same distance to the floor 20 and thereby a good foothold. The axis 19 about which the system rotates is parallel with the fore-and-aft line and preferably coaxial with the boat steering wheel 21.

Figure 8:
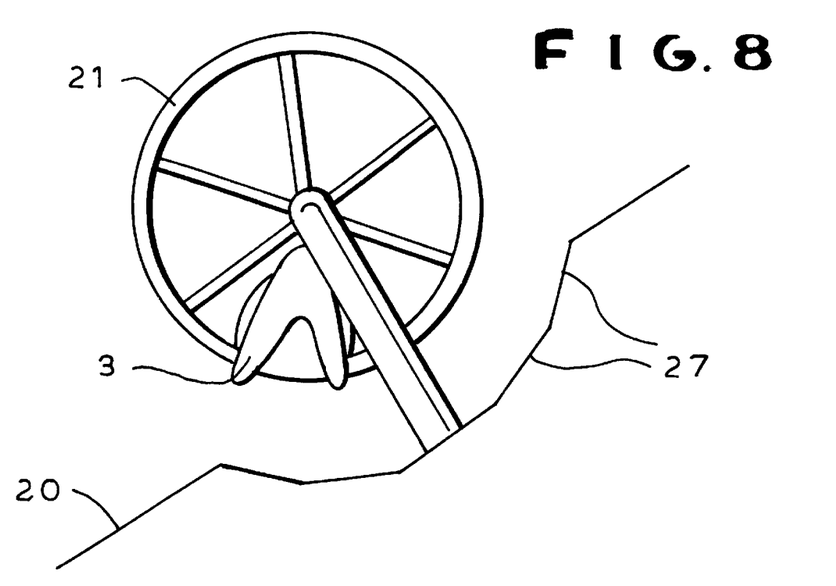
FIG. 8 shows the suspension according to FIG. 7 from the rear.

The axis 18 preferably coincides with the second lumbar vertebra of the driver, that is, about 26–27 cm above the seat surface 6. This depends on that at this height, the moving centre is located for the side bendings of the spine, which become actual when one strives to attain to keep head and cervical spine in the horizontal plane when the boat rolls laterally.

In the purpose of increasing the comfort an arm support can also (not shown) be mounted in connection to, or at the side of, the seat 3.

A handlebar 2 is also provided at the driver's seat for driving of the boat (course alignment). The handlebar 2 is constructed to take up forces that the driver might exert on the handlebar 2 and it thereby also serves as a support for the driver. The grips/handles 22 are located at a width of a shoulders distance from each other but advantageously may be still broader in order to easier absorb the forces the driver might exert on the handlebar at side jerks. Added width gives added stability for the driver. The very steering is also facilitated since a broader handlebar 2 constitutes a longer lever.

The handlebar 2 is essentially straight and placed in front of the seat 3.

The handle 22 of the handlebar 2 should be placed lowest in height with the seat 3 but can be placed up to 40 cm higher than the seat height 6. Hereby the arms of the driver and the handlebar 2 occupies a substantial part of the body weight at heavy bumps in the longitudinal direction or vertical direction of the boat.

In order to minimize the pronation in the wrist of the driver the outer parts of the handlebar 2 are slanted 10–30 degrees downwards in relation to the horizontal plane.

In the purpose of attaining damping the handlebar may also have a resilient mounting and the handles 22 may suitably be made in a vibration damping material. The handlebar 2 may also be provided with a spring element which absorbs forwards-downwards directed forces. This can be achieved by the steer trunk 23 being mounted in a rubber element 24 at the bottom end.

Further, the handlebar 2 may be equipped with devices 26 for control of speed/motor power, relative motor power (at several engines), inclination of the propeller, position of the trim planes (for example a toggle switch), reversing gear and so on. Thereby the driver does not need to release his hold of the handlebar but without a grip change yet may handle necessary controls. Hereby the driver continuously may maintain full own balance and simultaneously exert full control over the boat even in hard weather and during rough conditions.

The handlebar 2 is suitably adjustable in height and longitudinal direction to allow change of driving position or adaptation to different drivers. Further the handlebar 2 may be provided with cushioning 25 or with devices (not shown in closer detail) to fasten marine chart navigation equipment or communications equipment.

Figure 9:
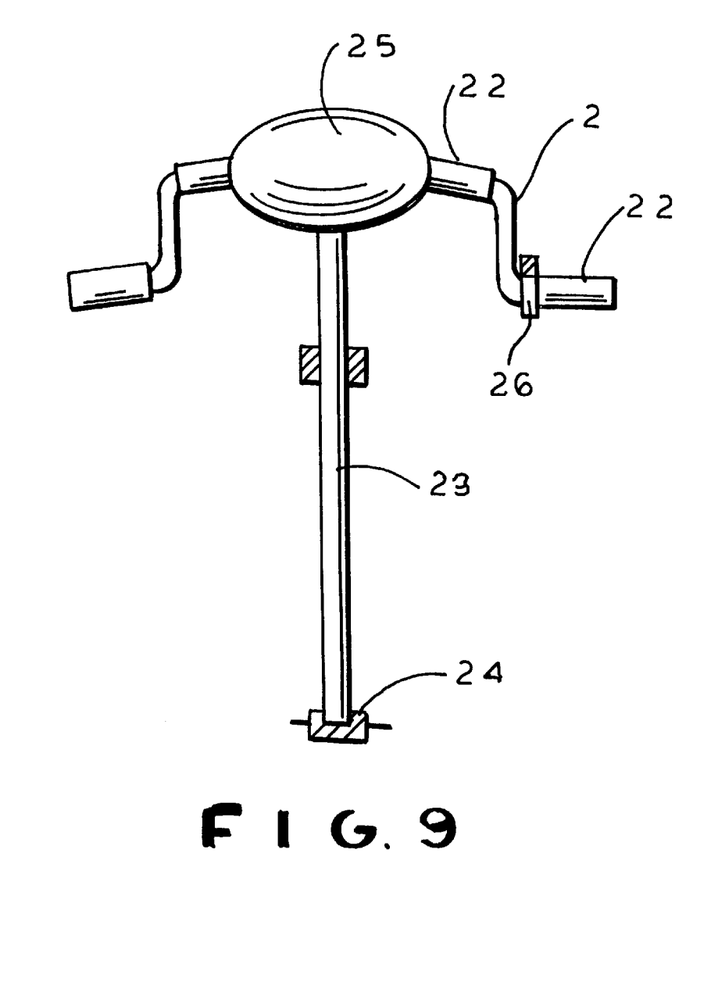
FIG. 9 shows a steering handle provided with two different grips.
Figure 10:
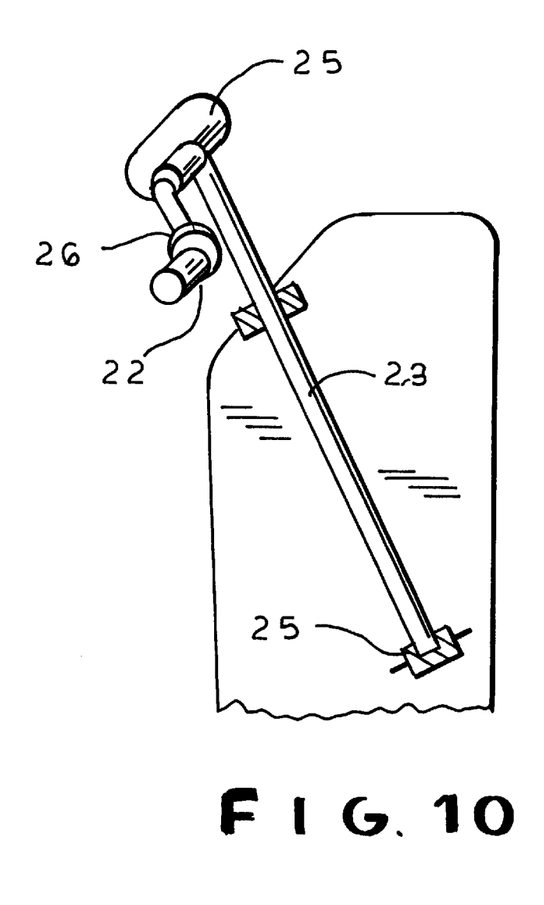
FIG. 10 shows the handle seen from the side.

The handlebar 2 can also be provided with handles 22 in different vertical positions (see FIG. 9) so that the driver quickly can vary his driving position between at least two different positions.

Figure 11:
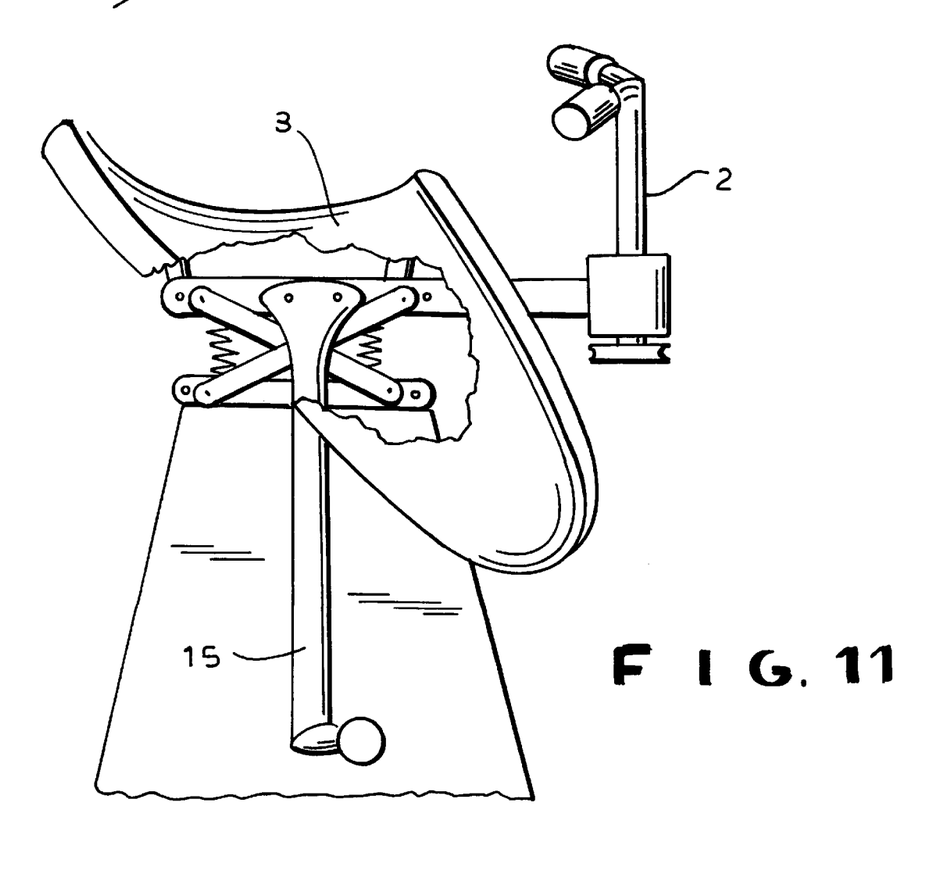
FIG. 11 shows the seat, foot support and/or a handle as a resilient unit.

In FIG. 11 is shown how the handlebar 2 can be mounted to the seat 3 so that the handlebar 2 and the seat 3 moves like a unit. In a similar manner the foot supports 15 can also be mounted to the seat 3.

The invention results in a number of advantages among other things that the driver when driving in hard weather in a natural way and without strain of the stretch muscles of the lumbar part of the back, may take a balanced position of the pelvis and the spine, and that the driver easily can transfer the body weight from the seat to the legs and feet, and thereby protect the spine from bumps and shocks, and that the handlebar fills the function of constituting a handle with a broad grip which provides a stabilizing function in the lateral direction and simultaneously constitute a support in the longitudinal direction and be of an aid when the driver wishes to rise.

The spine (the torso) in principle is suspended in two resilient and damping elements where the both arms constitute one and the both legs constitute the other element.

The present invention gives a better sitting position in that the driver is forced to sit with a more straight back than what is the case of a conventional seat. This gives smaller injury risks for the body and the back. By sitting on common seats, even by so called straddle seats the spine takes a curved position which entails increased risk for injuries by shocks. In the present invention the back in a natural way takes the same form as in standing position thanks to relaxation of the hamstring muscles on the rear of the thighs in the described sitting position.

A prerequisite that the legs shall be able to be used to take up the forceful shocks is that the feet can be placed right under the centre of gravity of the body at the same time as the thigh-torso and the knee angle is wider than 100 degrees. This implies a completely different construction from what is previously known.

Further the width of the handlebar preferably is substantially broader than the shoulder portion of the driver to enable efficient force absorption of longitudinally as well as laterally directed forces. Also, it is important that the handlebar is placed such that the arms point downwards more than 30 degrees and preferably more than 45 degrees so that it will be possible at shocks to transfer a part of the weight of the body, via the arms and the handlebar, to the boat.

The compressing forces hereby diminishes on the spine. The handlebar is suitably adjustable vertically and the handles are preferably covered with a shock absorbing material. The handlebar may be spring mounted either separately or integrated to a unit with the seat and possibly with the foot bars.

The handlebar should be so direct acting (possibly servo assisted) that it constantly gives the driver tactile information of how the rudder (the pinion, the propeller, the nozzle) is directed. Especially when boats jump in the air it is essential to obtain this information to optimize the rudder angle at the landing. The information from a visual rudder indicator at stressed circumstances, never has time enough to be processed in the brain before one lands.

Since it is possible in a tactile way both to control and read the rudder angle and throttle simultaneously as one holds the handlebar, the position of which has been optimized so as to give the best possible balance and best possibilities to protect the body from harmful influence of shocks, the safety increases when driving the boat.

Earlier described boat driver's seats mainly are of three types.

1. Chairs with sitting surface to sit on with the thighs directed mainly horizontally whereby consequently the feet will be located in front of the vertical line through the centre of gravity of the body. Frequently these chairs have a back and sometimes spring and damping mechanisms.

2. So called straddle seats with or without a back. Earlier known seats are designed for same sitting position as on usual chairs with the thighs mainly horizontally oriented and consequently the feet placed in front of the vertical line through the centre of gravity of the body.

3. Seats with a seat sloping forward designed to give support from the rear at standing position. These seats by necessity are slanted forward. Consequently one can not sit in such seats without stretching the legs forward to prevent from sliding forwards and downwards. This stretching of the legs makes it impossible to use the legs for absorbing shocks from beneath. This type or seat is frequently completed with a back and lateral support.

With previously known spring mechanisms it has not been practically possible to achieve a large stroke enough to be able to allow the seat to follow up in a half standing or standing position.

The present spring-damping mechanism results in the advantage that it needs not to be adjusted according to the weight of the driver. Thanks to its great progressivity and great stroke it sinks downwards to an appropriate balance position for each individual.

This can be achieved by means of broad plate springs of e.g. steel or composite material. By tilting the springs backwards upwards from its mounting in the boat and the seat being fastened at the free and the spring movement can be made substantially vertical or directed downwards-backwards which in certain situations may be advantageous since the distance of the shoulders to the low placed handlebar thereby is kept relatively constant.

A further advantage of this construction is that it is almost free of friction.

Since the bases of the springs is fixed to the hull via rubber like material a certain spring action in the lateral direction is allowed.

it is also conceivable to use rubber like material in the mounting between the spring and the seat to allow a certain rotary movement in the seat.

The seat is designed to give a firm support for the thighs, seat and the knees of the driver in sitting as well as in half standing position and, in certain cases, yet up into standing position. Preferably the whole insides of the thighs in for instance standing position support against side portions of the seat. The upper surface of the seat is dome-shaped so that no edges cut into the insides of the thighs even if the thighs should be allowed to point very steeply downwards or completely vertically.

In the object of aiding the seat to move synchronously with the driver a ballast may be mounted in the seat body. This additional weight for example may weigh 80 kg or more. Through this arrangement the seat acceleration is damped at heavy yerks.

By placing foot bars at different heights above the floor the need of vertical setting of the seat is eliminated. These foot bars should be so broad (5–9 cm) that they give support for the major part of the forefoot but allow spring movement in the ankle joint. They should be provided with edges outwards and inwards to prevent the foot from sliding off sideways.

The foot bars may be adjustable in vertical direction and covered by shock absorbing material. They may be provided with springs either separate or in a unit with the seat.

In vessels with double engines and where control of the vessel may be carried out by power control or control of the pitch of the propellers such control may be carried out by means of a roll accelerator handle on each side. Hereby the stable grip that is desirable in hard weather can be maintained at the same time as all important parameters of control of course and speed are controlled.

Naturally powertrim or trim planes should also be able to be controlled from the handlebar without need of releasing one's hold. This is done suitably by means of toggle switches placed easily accessible for the thumbs.

The invention is not limited to the above described embodiments but of course can be varied within the stops of protection of the patent claims. Thus the invention for example also may be applied on other form of transportation means than sea vessels.

I claim:

1. A seat system for a driver of a motor or sail driven vessel, comprising a saddle shaped seat and a steering device, the seat having a generally horizontal main seat surface and essentially vertically oriented side portions extending downwardly and outwardly from the main seat surface to a point proximate a driver's knees and extending forwardly of a vertical line passing through a front edge of the main seat surface to support the inner sides of the driver's thighs and knees in a driver working position.

2. A one-person seat system for a driver of a motor or sail driven vessel, comprising a saddle shaped seat and a steering device, the seat having a generally horizontal main seat surface with inclined portions at front and rear ends thereof and essentially vertically oriented side portions extending downwardly and outwardly from the main seat surface and extending forwardly of a vertical line passing through a front edge of the main seat surface to support the inner sides of the driver's thighs and knees in a driver working position, the seat being arranged pivotably about an axis oriented in the driving direction.

3. The seat system of claim 1 or claim 2, wherein the seat is mounted on a support, the support including foot rests for the driver, the foot rests being positioned with respect to the main seat surface such that a sitting driver's knee angle is between 80 and 100 degrees and the driver's thigh-torso angle is between 100 and 160 degrees.

4. The seat system of claim 3, wherein the seat side portions extend outwardly from a longitudinal axis of the seat at an angle of between 5 and 15 degrees.

5. A seat system according to claim 3, wherein the main seat surface and the side portions are resiliently suspended in relation to the vessel.

6. A driver's seat according to claim 3 further comprising resilient elements coupled to the seat to provide elasticity and damping for the seat.

7. A driver's seat according to claim 3, the steering device is connected to the seat whereby it moves with the seat as one unit in relation to the vessel.

* * * * *